United States Patent [19]

Spears et al.

[11] Patent Number: 5,729,194
[45] Date of Patent: Mar. 17, 1998

[54] BACKUP SYSTEM TO POSITION VEHICLE RELATIVE TO STATIONARY TRAILER DURING BACKING PROCEDURE

[76] Inventors: Dan E. Spears, 3515 Westfield Dr., Brandon, Fla. 33511; Gerald J. Carey, II, 3525 Washington Rd., Valrico, Fla. 33594

[21] Appl. No.: 756,436

[22] Filed: Nov. 26, 1996

[51] Int. Cl.⁶ ..................................................... G08B 21/00
[52] U.S. Cl. .......................... 340/431; 33/264; 280/477; 340/435
[58] Field of Search ..................... 340/425.5, 431, 340/435, 901, 903, 686; 280/477, 511; 33/264, 286; 250/491.1

[56] References Cited

U.S. PATENT DOCUMENTS

| | | |
|---|---|---|
| 3,924,257 | 12/1975 | Roberts. |
| 4,593,264 | 6/1986 | Engle ........................ 340/431 |
| 4,852,901 | 8/1989 | Beasley et al. ............ 33/264 |
| 4,938,495 | 7/1990 | Beasley et al. ............ 340/431 |
| 4,988,116 | 1/1991 | Evertsen ...................... 340/686 |
| 5,108,123 | 4/1992 | Rubenzik ................... 340/431 |
| 5,191,328 | 3/1993 | Nelson ....................... 340/431 |
| 5,530,421 | 6/1996 | Marshall et al. ........... 340/435 |

Primary Examiner—Brent A. Swarthout

[57] ABSTRACT

Various configurations of components to provide for either informing an operator of a vehicle of relative positions of the vehicle and a stationary trailer during a backing procedure or informing the operator of an arrival at a hitchable position during the backing procedure. Three general embodiments are disclosed which include use of a magnetically activated switch, use of an autofocus assembly and use of a light reflective arrangement. Several possible combinations of the separate embodiments are explained which enhance the function of the assemblies to ensure proper positioning of the vehicle relative to the stationary trailer. Explanations of each embodiment are provided along with numerous variations to each. Each of the embodiments rely upon a component, or group of components, located on the vehicle which require a power source to operate. When it is a requirement that a component be placed upon the stationary trailer, that component does not require a source of power. An explanation of various modes of informing the operator of the feedback from the deployed components are presented. These include both audio feedback as well as visual feedback.

12 Claims, 9 Drawing Sheets

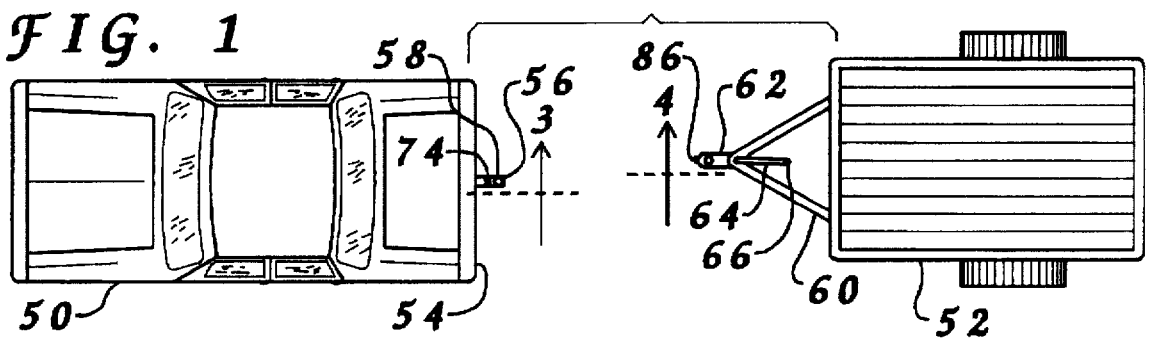
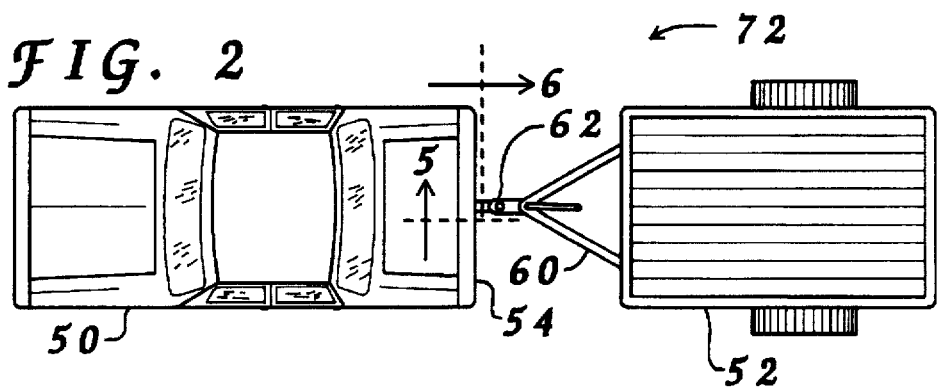
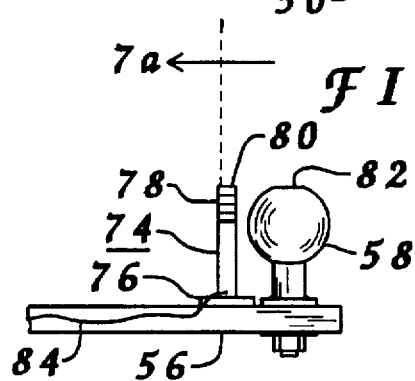
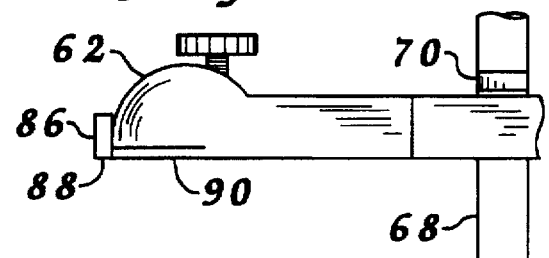
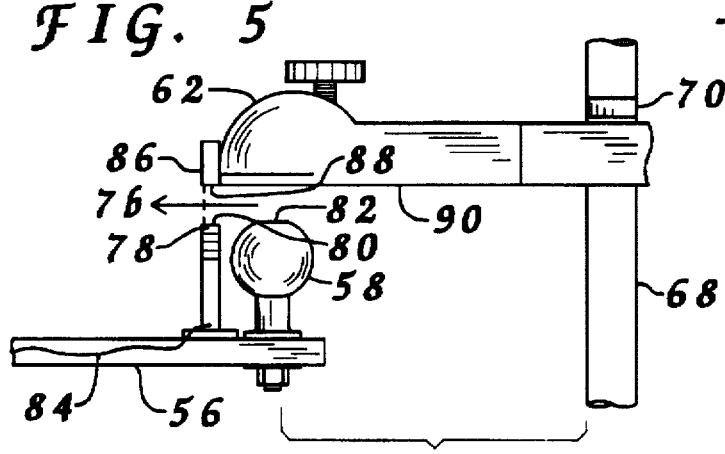
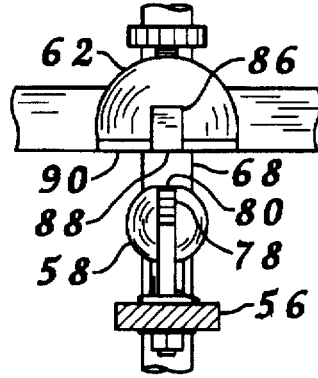

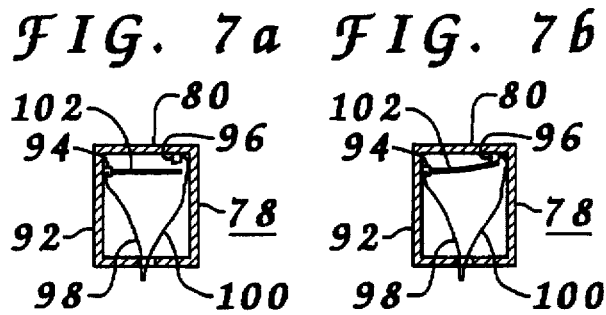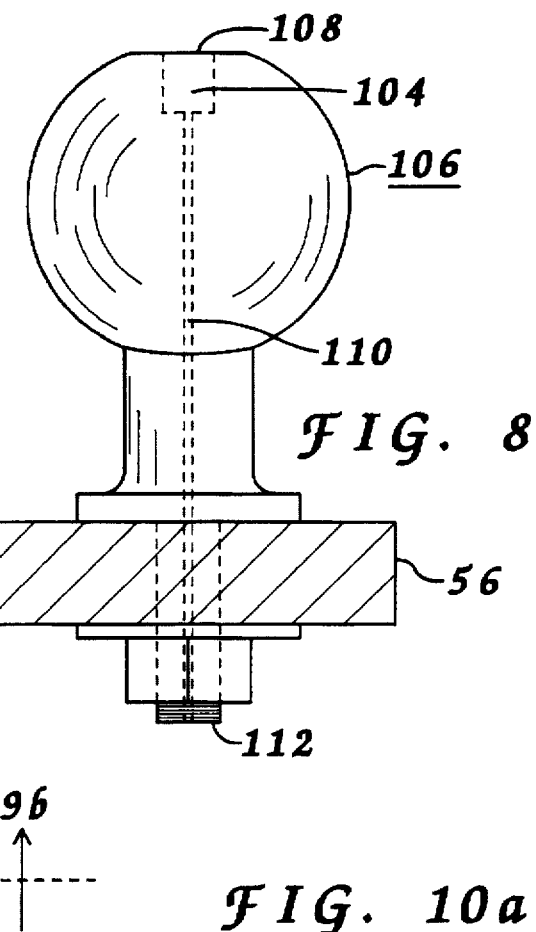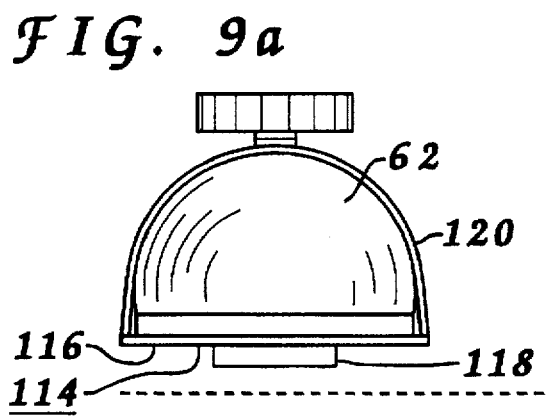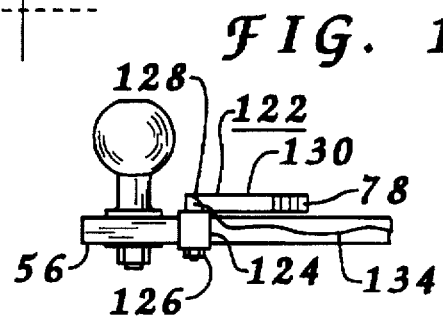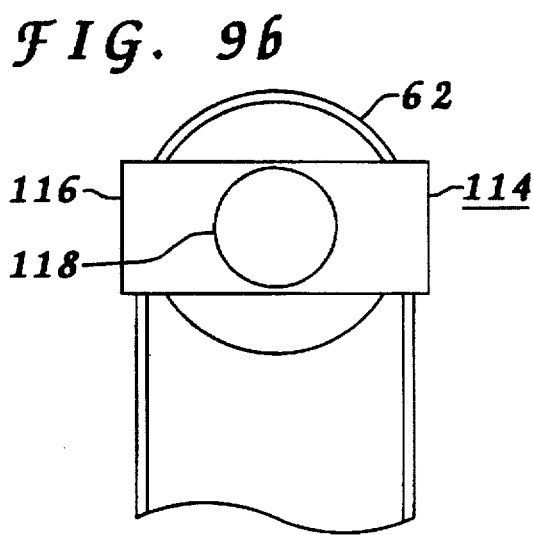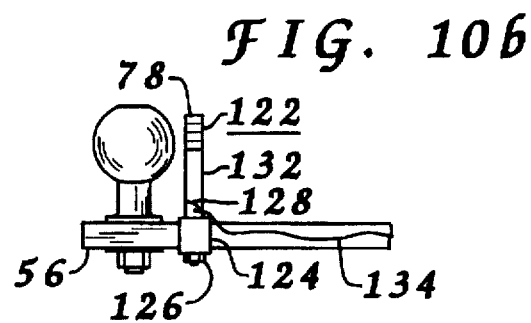

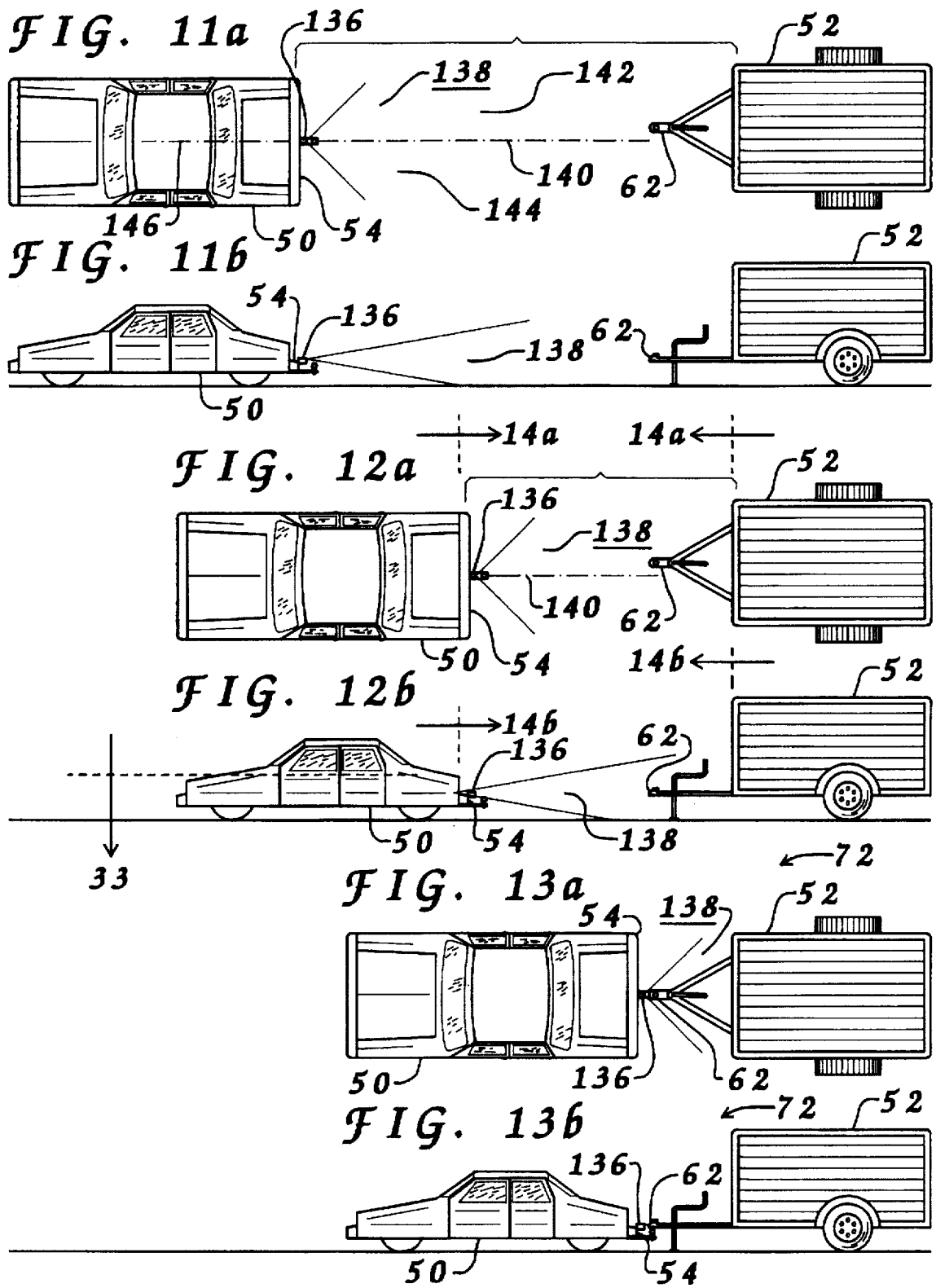

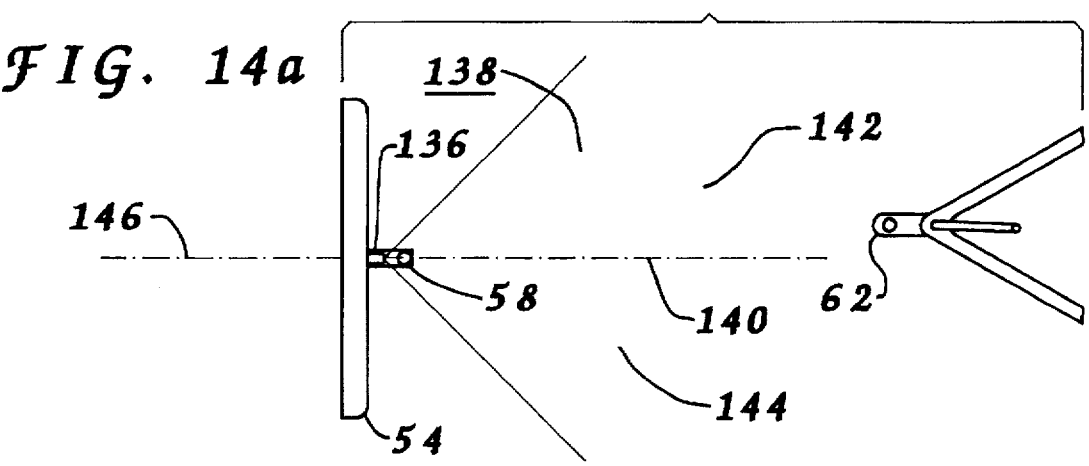
FIG. 14a
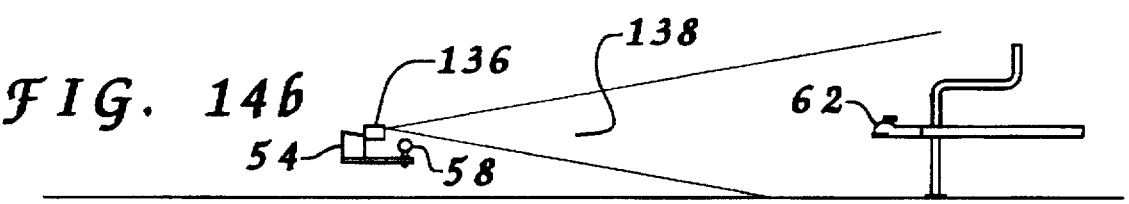
FIG. 14b
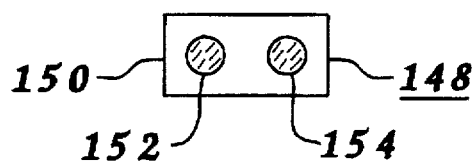
FIG. 15a
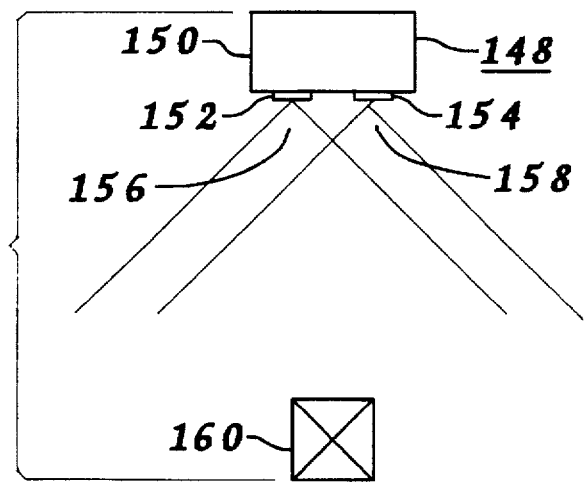
FIG. 15b
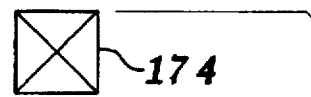
FIG. 16
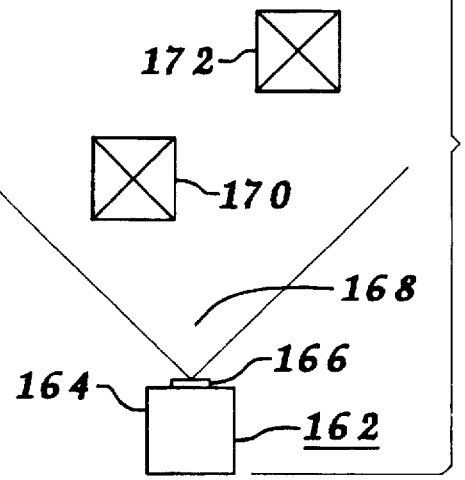

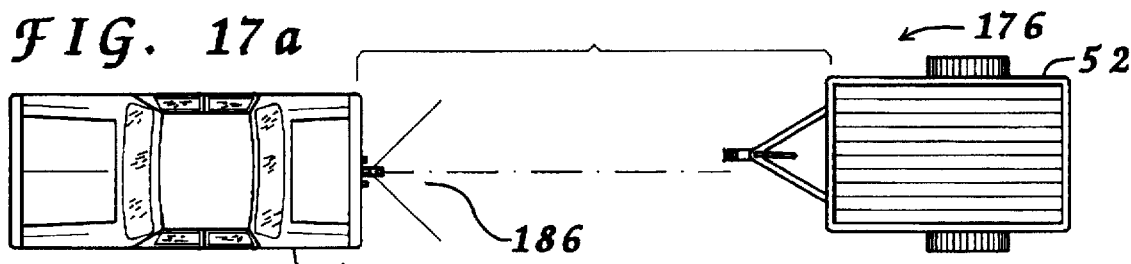
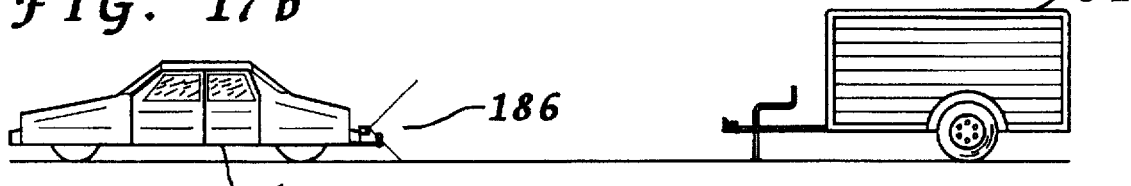
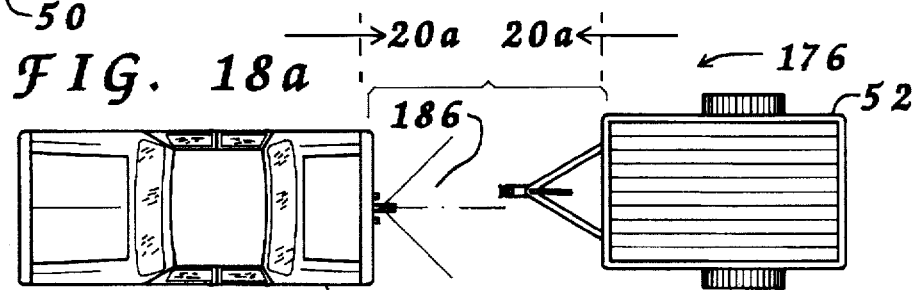
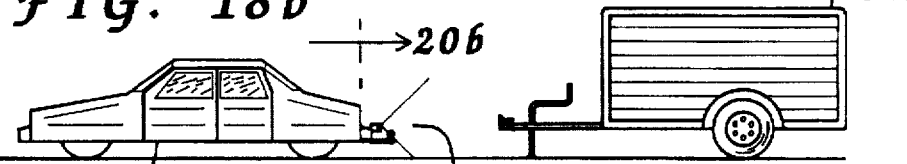
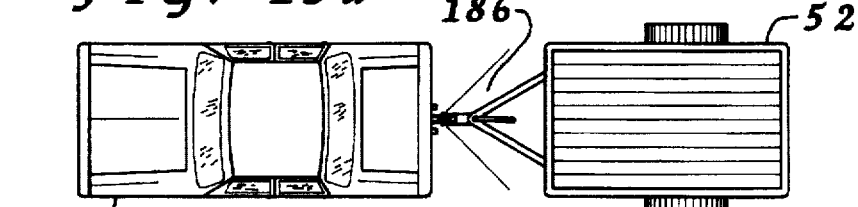
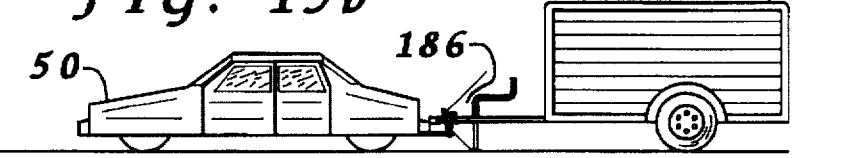

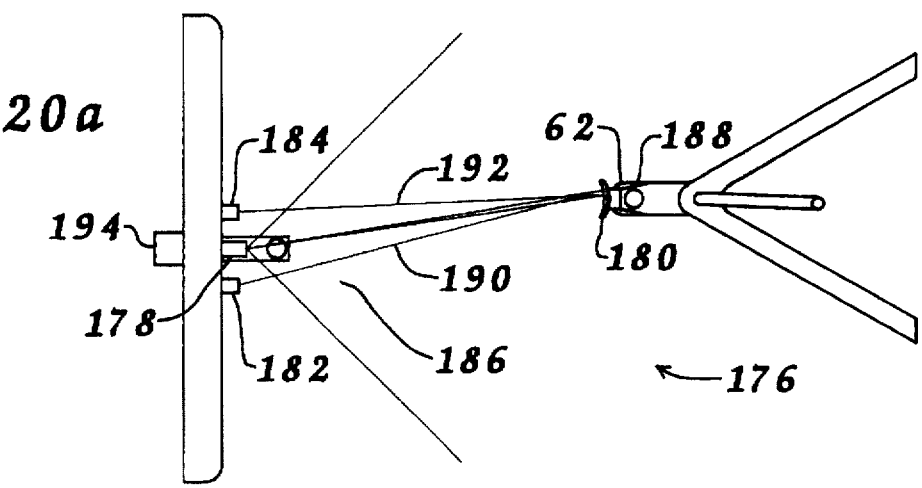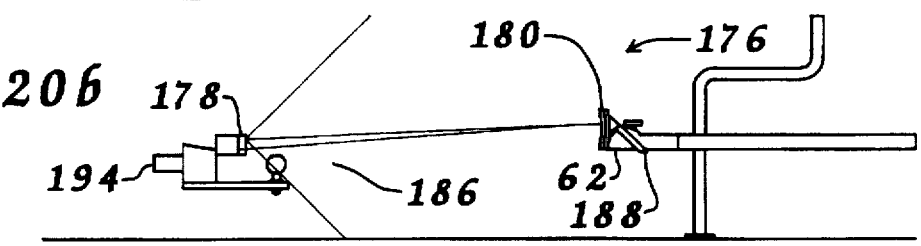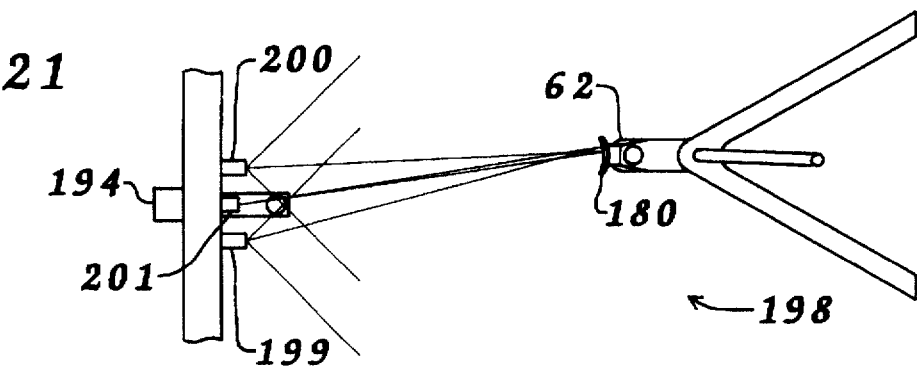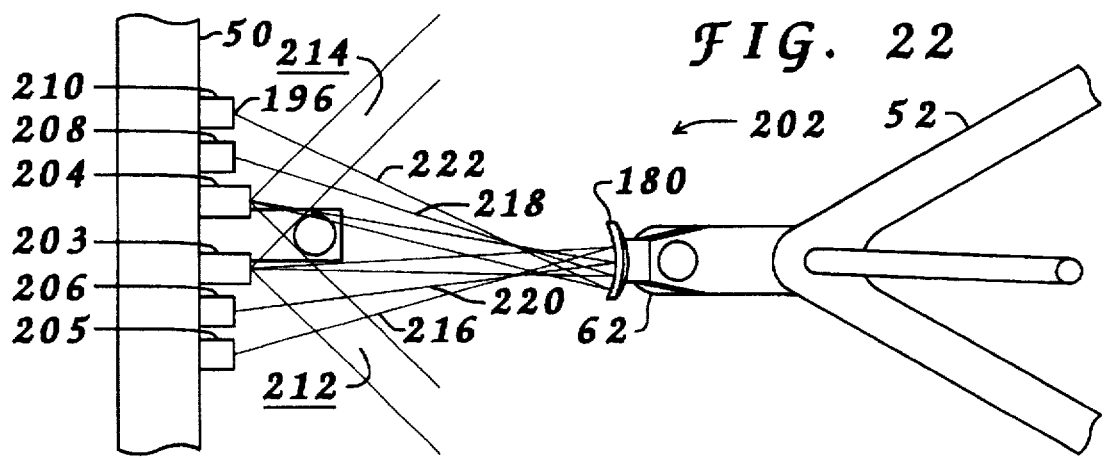

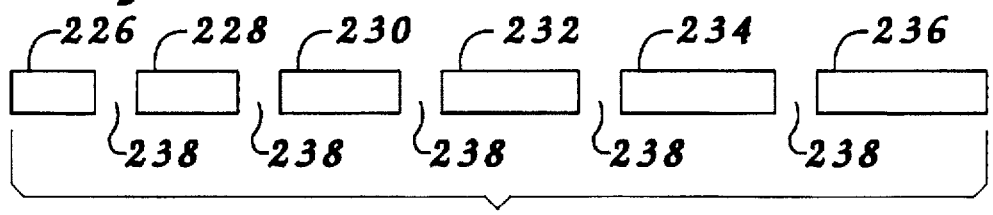
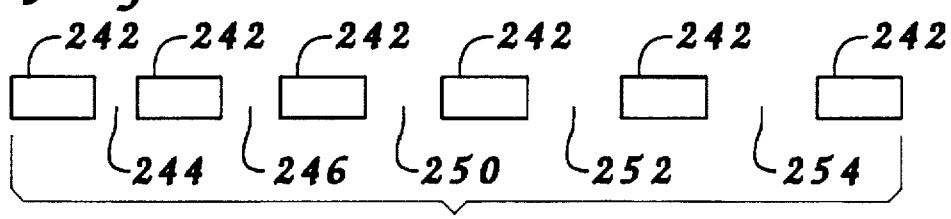
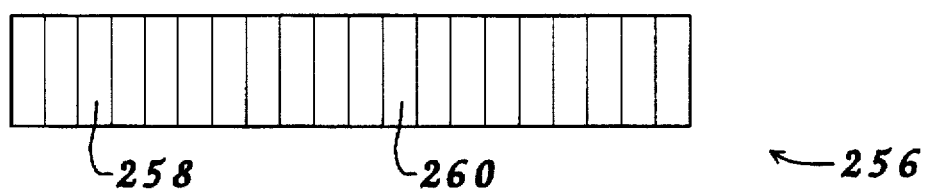
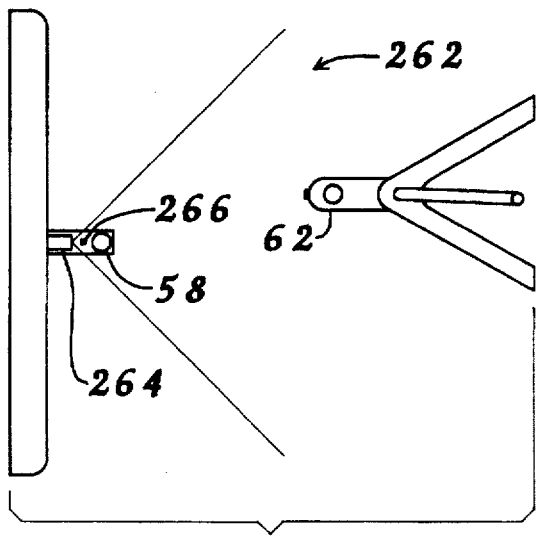
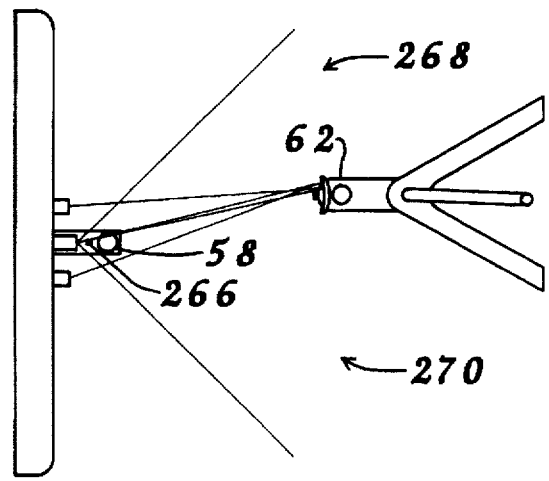

BACKUP SYSTEM TO POSITION VEHICLE RELATIVE TO STATIONARY TRAILER DURING BACKING PROCEDURE

BACKGROUND

1. Field of the Invention

Generally, the invention relates to devices which provide an operator of a motor vehicle with guidance during a backing procedure of the motor vehicle relative to a stationary trailer. More specifically, the invention relates to electronic devices mounted on the motor vehicle to provide such guidance to the operator.

2. Description of the Prior Art

Motor vehicles are often utilized to provide towing transport to wheeled trailers. Prior to coupling to the motor vehicle these wheeled trailers are stationary trailers. This transport generally takes the form of coupling the trailer rearward on the motor vehicle and pulling the trailer therebehind. Specially designed ball coupling members are known in the art which are mounted, generally permanently, proximate a central position at the rearward extent of the motor vehicle. Attachment of a securing assembly, which has attached thereto the ball coupling member, often occurs to the bumper of the motor vehicle with secondary attachment occurring to the lower extent of the frame inward from the rear of the motor vehicle. The ball coupling member often extends rearward slightly from the motor vehicle to provide for ready access thereto. Alternatively, it is known to directly mount the ball coupling member on the bumper of the motor vehicle to extend upward therefrom without reliance upon the securing assembly. This usage is generally limited to trucks, as exampled by pickup type trucks, which have specially designed rear bumpers which permit mounting thereon while providing sufficient clearance to allow coupling thereto of the stationary trailer.

Applicable wheeled trailers have a specially designed receiving coupling member of an extending hitch mounted forward along the longitudinal axis of the wheeled trailer. Following coupling connection, this receiving coupling member extends over the ball coupling member attached to the motor vehicle and is secured thereto to connect the wheeled trailer to the motor vehicle. The connection between these two members providing for pivotal movement horizontally, and to a certain extent vertically, between the motor vehicle and the connected wheeled trailer.

Use of the term trailers herein broadly refers to wheeled units which may be towed by a passenger sized motor vehicle. This usage of the term trailer include units having a primary duty of providing towable transport as well as units which are towable, yet have a distinctly different primary duty. A primary duty of providing towable transport refers to units which are distinctly dedicated to being towed while providing for holding separate items attached thereto or carried therein. Towable units which have a distinctly different primary duty refer primarily to attachable units which have axles having wheels mounted thereon wherein the attachable units have separate motion generation means. Examples of trailers within these broad definitions include closed transport carriers, open transport carriers, flat bed carriers, vehicle dollies which carry a forward or rear set of a vehicles wheels, tow bars which mount to wheeled vehicles wherein the wheeled vehicle becomes the wheeled trailer, horse carriers and boat trailers amongst others. The trailers may have a single axle or may have multiple axles.

Many couplings of stationary trailers to motor vehicles are performed by persons who have previously performed many identical or similar couplings. These persons, due to their previous experience, may be capable of accurately aligning the ball coupling member and the receiving coupling member a relatively high percentage of the time during the backing procedure.

Many couplings of stationary trailers to motor vehicles are performed by persons who have little prior experience making such couplings. These persons, due to their lack of previous experience, may experience difficulty aligning the ball coupling member and the receiving coupling member during the backing procedure or may have difficulty judging when the vehicle arrives at a hitchable position relative to the stationary trailer during the backing procedure.

There exist two general guidance modes for the operator of the motor vehicle during a backing procedure when other guidance systems, mentioned below, are not deployed. The first involves the operator acting alone and relying upon their own judgement of orientation of the ball coupling member and the receiving coupling member during the backing procedure. The second involves the operator acting in cooperation with a second person who is positioned where observations of the orientation of the ball coupling member and the receiving coupling member may occur while simultaneously permitting visual or audible communication with the operator of the motor vehicle during the backing procedure.

In regard to the first guidance mode, where the operator acts alone, there exist several problems which must be overcome. Without regard for the type of motor vehicle utilized to tow the wheeled carrier, due to the central and low mounting of the ball coupling member, visibility of the ball coupling member is limited or completely hidden from a sight range of the operator of the motor vehicle. While the receiving coupling member may initially be within the sight range of the operator of the motor vehicle, due to the spacing which may exist during initial placement of the motor vehicle, the receiving coupling member normal is lost from sight by the operator during backing toward the stationary trailer. Normally, the operator will attempt to observe a relationship between elements on the stationary trailer which will remain within the sight range and the receiving coupling member. Similarly, the operator will attempt to observe a relationship between elements on the motor vehicle which are within the sight range and the ball coupling member. This action is further complicated due to the motor vehicle's controls being situated to one side of the motor vehicle from the longitudinal axis thereof. During the backing procedure mental computations must be made to adjust for the varying angle from the operator to the two coupling members which often are then not within the sight range of the operator.

Normally, at least during the final movement of the motor vehicle toward the stationary trailer during the backing procedure, the operator must rely upon orientation of the observed elements on the stationary trailer and the observed elements on the motor vehicle to act as guides. This produces results which are less efficient than desired. Without regard for the guidance mode employed, damage may be inflicted upon the motor vehicle or the trailer when impact occurs therebetween.

In regard to the second guidance mode, where the operator acts in coordination with a second person, there exist several problems which must be overcome. Consideration must be given to the experience of the second person and that person's ability to convey directional instructions to the operator of the motor vehicle. Often instructions of right and left are misconstrued due to the positional relationship of the two persons involved. Additionally, it is necessary for adjustment to be made for the reaction time of the operator of the motor vehicle. Accessibility may be inconvenient to a suitable position from which the second person may observe the backing procedure. Lighting conditions may be less than adequate during the backing procedure to place the motor vehicle and the stationary trailer in coupling alignment.

Numerous attempts have been made to provide devices which permit the operator of the motor vehicle to be aware of the relational position of the motor vehicle relative to the stationary trailer. These devices generally fall within three groups. The first group involve devices which allow the operator to visually observe the ball coupling member and objects in close proximity thereto. The second group involve guide elements which generally connect at distal ends to the ball coupling member and the receiving coupling member. The third group involve electronic devices which provide various feedback to the operator indicative of the relational position of the motor vehicle and the stationary trailer.

Within the first group are various mirrors which act singularly or in combination to provide the operator with the ability to be in visual contact with the ball coupling member while the operator is in an operating position within the motor vehicle. Several deficiencies have prevented devices within this group from becoming widely accepted. There exists a universal requirement that the mirrors be mounted prior to the backing procedure and removed following coupling and prior to transport of the coupled trailer. Depending upon the device, mounting may occur to the motor vehicle or to the stationary trailer. Following mounting adjustment must occur which may be time consuming. Additionally, when not in use the device must be stored, yet remain accessible to the motor vehicle or to the stationary trailer.

Within the second group are various guide members which act to visually inform the operator of the relative position of the ball coupling member and the receiving coupling member. A common theme has connection of a first end occurring to, or adjacent, the ball coupling member with connection of a second end occurring to, or adjacent, the receiving coupling member. Either a sliding extension or a scissoring extension then exists between the first end and the second end of the device. Extensions may be provided which extend to within the sight range of the operator to act as guidance during the backing procedure. Several deficiencies have prevented devices within this group from becoming widely accepted. There exists the requirement of connection of these devices to the motor vehicle, the stationary trailer or both. This may be awkward or otherwise inconvenient. When not in use the device must be stored, yet remain accessible to the motor vehicle or to the stationary trailer. Additionally, these devices provide indications of relative positioning and interpretation of these indications may produce results which are less accurate than desired.

Within the third group are various electronic devices which inform the operator of the motor vehicle of the relational position of the motor vehicle and the stationary trailer. Generally, these devices have at least two electronic components. A first electronic component is attached to the motor vehicle proximate the rear extent thereof. A second electronic component is attached to the stationary trailer proximate the forward extent thereof. At least the electronic component mounted on the motor vehicle then receives transmissions from the electronic component mounted on the stationary trailer. This received transmission, depending upon the various orientation of the device, is converted and a signal is provide to the operator indicative of relational position of the first electronic component and the second electronic component. Several deficiencies have prevented devices within this group from becoming widely accepted. Providing power to the component mounted on the motor vehicle is easily accomplished from the motor vehicle's power supply. On the other hand, the stationary trailer rarely has a power supply which is active during a coupling procedure. Therefore, it becomes necessary, and a significant drawback to these devices, to provide power to the electronic component mounted on the stationary trailer.

Various attempts have been made to provide an electronic device capable of providing feedback to the operator of the motor vehicle to guide the operator in placement of the motor vehicle relative to the stationary trailer during a backing procedure. Due primarily to the common requirement of placement of a separate dedicated element on the trailer these attempts have been less efficient than desired. As such, it may be appreciated that there continues to be a need for an electronic device which resides solely on the motor vehicle. This electronic device needs to have the capability of accurately measuring angular orientation and relative distance to the nearest point on the stationary trailer during the backing procedure. This electronic device needs to provide feedback to the operator of the measured positional relationship to the stationary trailer during the backing procedure to guide the operator's placement of the motor vehicle relative to the stationary trailer. The present invention substantially fulfills these needs.

SUMMARY

In view of the foregoing disadvantages inherent in the known types of backing guidance devices for coupling a stationary trailer to a motor vehicle, your applicants have devised a method of providing feedback to the operator of the motor vehicle indicative of relational positioning of the motor vehicle and the stationary trailer wherein electronic equipment is mounted solely on the motor vehicle.

In a first embodiment of the invention a magnetically activated switch is mounted on a vehicle in close proximity to a coupling ball member. A magnetic member is mounted on a stationary trailer in close proximity to a coupling member. The switch is linked to inform an operator when the switch moves into close proximity to the magnetic member. Such movement into close proximity being indicative of relational positioning of the vehicle and the stationary trailer in a hitchable position where coupling therebetween may readily occur.

In a second embodiment of the invention an autofocus assembly is mounted on a vehicle in close proximity to a coupling ball member. The autofocus assembly has a predetermined sight zone which extends rearward from the vehicle along a center longitudinal axis of the vehicle. The autofocus assembly is capable of identifying a closest object within the sight zone. During a backing procedure to position the vehicle relative to a stationary trailer in a hitchable position, a nearest point on the stationary trailer becomes the closest object within the sight zone. Simultaneous with the identification of the closest object within the sight zone, the autofocus assembly determines a distance measurement to the object and an angular orientation measurement to the object. These measurement are then continuously transferred to an operator of the vehicle to inform the operator of the relational position of the vehicle relative to the stationary trailer during the backing procedure.

In a third embodiment of the invention at least one, (1), sending unit is mounted on a vehicle in close proximity to a coupling ball member. The sending unit produces a transmitted light having uniquely identifiable characteristics and an electronic sending signal indicative of the unique characteristics of the transmitted light. A reflector is mounted on a stationary trailer in close proximity to a coupling member. The reflector reflects light, including the light transmitted by the sending unit. At least one, (1), receiving unit is mounted on the vehicle. The receiving unit receives light, including the reflected light from the reflector. The receiving unit produces an electronic receiving signal indicative of the unique characteristics of the received light. In use, one, (1), unit is selected from either the sending unit or the receiving unit and two, (2), units of the remaining selection are deployed. A comparison of the electronic signs produced by the deployed sending unit(s) and receiving unit(s) result in a determination of a measurement of distance and a measurement of alignment of a relative placement of the sending unit(s), the reflector and the receiving unit(s). During a backing procedure to position the vehicle relative to the stationary trailer in a hitchable position, these measurement are continuously transferred to an operator of the vehicle to inform the operator of the relational position of the vehicle relative to the stationary trailer.

Various combinations of the three separate embodiments may be employed to enhance the operators ability to properly position the vehicle relative to the stationary trailer during a backing procedure.

Our invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a backup system relying upon electronic equipment which mount solely on the motor vehicle.

Other object include;

a) to provide for utilization of a magnetically activated switch on the vehicle and a magnetic member on the trailer wherein the switch is activated when brought into close proximity to the magnetic member to inform the operator that the vehicle and the stationary trailer are in a relational position wherefrom hitching may occur.

b) to provide for utilization of an autofocus assembly mounted on the vehicle wherein accurate measurements may occur of a distance measurement and angular orientation of the vehicle and the closest point on the stationary trailer during the backing procedure to inform the operator of the distance measurement and the angular orientation of the vehicle and the stationary trailer throughout the backing procedure.

c) to provide for utilization of a light generating unit mounted on the vehicle, a reflector mounted on the stationary trailer and at least two, (2), receiving units mounted on the vehicle wherein accurate measurements may occur of a distance measurement and angular orientation of the vehicle and the reflector mounted on the stationary trailer during the backing procedure to inform the operator of the distance measurement and the angular orientation of the vehicle and the stationary trailer throughout the backing procedure.

d) to provide for utilization of at least two, (2), light generating units mounted on the vehicle, a reflector mounted on the stationary trailer and a receiving unit mounted on the vehicle wherein accurate measurements may occur of a distance measurement and angular orientation of the vehicle and the reflector mounted on the stationary trailer during the backing procedure to inform the operator of the distance measurement and the angular orientation of the vehicle and the stationary trailer throughout the backing procedure.

e) to provide for feedback to the operator of the motor vehicle indicative of angular orientation of the ball coupling member and the nearest extent of the stationary trailer.

f) to provide for feedback to the operator of the motor vehicle indicative of a measurement of distance of the ball coupling member and the nearest extent of the stationary trailer.

g) to provide for the feedback to the operator indicative of relational positioning of the ball coupling member and the nearest extent of the stationary trailer to be in a visual display format.

h) to provide for the feedback to the operator indicative of relational positioning of the ball coupling member and the nearest extent of the stationary trailer to be in a visual light format.

i) to provide for the feedback to the operator indicative of relational positioning of the ball coupling member and the nearest extent of the stationary trailer to be in an audio format.

j) to provide for at least one, (1), electronic element of the backup system to reside within a cavity in the ball coupling member.

k) to provide for the backup system to rely upon image rendering to determine relational positioning of the ball coupling member and the nearest extent of the stationary trailer.

l) to provide for the backup system to rely upon light transmission and reflective reception to determine relational positioning of the ball coupling member and the nearest extent of the stationary trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is an overhead view of a vehicle and a stationary trailer positioned prior to beginning a backing procedure.

FIG. 2 is an overhead view of the vehicle and the stationary trailer shown in FIG. 1 in a hitchable position following the backing procedure.

FIG. 3 is a side plan view as taken from the section line '3' shown in FIG. 1.

FIG. 4 is a side plan view as taken from the section line '4' shown in FIG. 1.

FIG. 5 is a side plan view as taken from the section line '5' shown in FIG. 2.

FIG. 6 is a front plan view as taken from the section line '6' shown in FIG. 2.

FIG. 7a is a sectional view as taken from the section line '7a' shown in FIG. 3.

FIG. 7b is a sectional view as taken from the section line '7b' shown in FIG. 5.

FIG. 8 is a front plan view of a coupling ball member attached to a vehicle extension member.

FIG. 9a is a front plan view of a magnet member attached to a receiving coupling member.

FIG. 9b is a bottom view as taken from the section line '9b' shown in FIG. 9a.

FIG. 10a and FIG. 10b are side plan views of a displacable magnetic switch assembly shown in alternating positions attached to a vehicle extension member.

FIG. 11a is an overhead view of a vehicle having an autofocus assembly and a stationary trailer positioned prior to beginning a backing procedure.

FIG. 11b is a side plan view of the view depicted in FIG. 11a.

FIG. 12a is an overhead view of the vehicle and stationary trailer shown in FIG. 11a and FIG. 11b during the backing procedure.

FIG. 12b is a side plan view of the view depicted in FIG. 12a.

FIG. 13a is an overhead view of the vehicle and stationary trailer shown in FIG. 11a, FIG. 11b, FIG. 12a and FIG. 12b in a hitchable position following the backing procedure.

FIG. 13b is a side plan view of the view depicted in FIG. 13a.

FIG. 14a is an overhead view as taken from the section lines '14a' shown in FIG. 12a.

FIG. 14b is a side plan view as taken from the section lines '14b' shown in FIG. 12b.

FIG. 15a is a front plan view of a dual image autofocus assembly.

FIG. 15b is an overhead view of the dual image autofocus assembly shown in FIG. 15a and an object.

FIG. 16 is an overhead view of an autofocus assembly and various distributed objects.

FIG. 17a is an overhead view of a vehicle having a light reflective assembly and a stationary trailer having a reflector positioned prior to beginning a backing procedure.

FIG. 17b is a side plan view of the view depicted in FIG. 17a.

FIG. 18a is an overhead view of the vehicle and stationary trailer shown in FIG. 17a and FIG. 17b during the backing procedure.

FIG. 18b is a side plan view of the view depicted in FIG. 18a.

FIG. 19a is an overhead view of the vehicle and stationary trailer shown in FIG. 17a, FIG. 17b, FIG. 18a and FIG. 18b in a hitchable position following the backing procedure.

FIG. 19b is a side plan view of the view depicted in FIG. 19a.

FIG. 20a is an overhead view as taken from the section lines '20a' shown in FIG. 18a.

FIG. 20b is a side plan view as taken from the section lines '20b' shown in FIG. 18b.

FIG. 21 is an overhead view of a second embodiment of a light reflective assembly and the reflector during a backing procedure.

FIG. 22 is an overhead view of a third embodiment of a light reflective assembly and the reflector during a backing procedure.

FIG. 23 is a graphical depiction of a sequence of light emissions having differing durations of emission.

FIG. 24 is a graphical depiction of a sequence of light emissions having differing durations of pause between sequential emissions.

FIG. 25 is a graphical depiction of a spectrum of light.

FIG. 26 is an overhead view of a combination of an autofocus system and a magnetic switch system.

FIG. 27 is an overhead view of a combination of a light reflective system and a magnetic switch system.

DESCRIPTION

Figure 28:
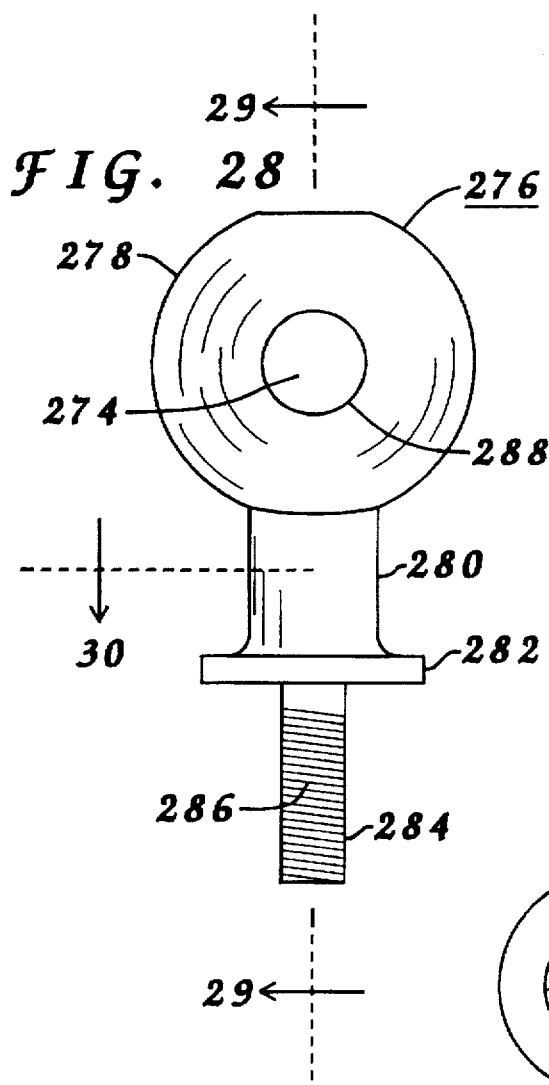
FIG. 28 is a rear plan view of a coupling ball having a cavity therein.
Figure 29:
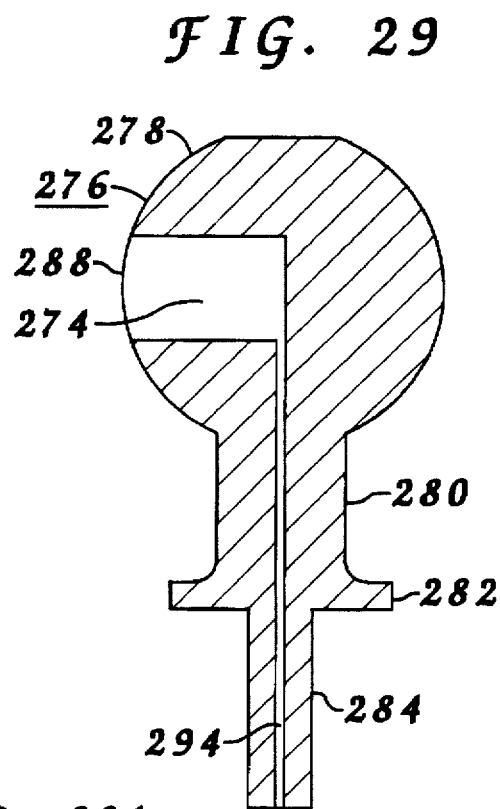
FIG. 29 is a sectional view as taken from the section line '29' shown in FIG. 28.
Figure 30:
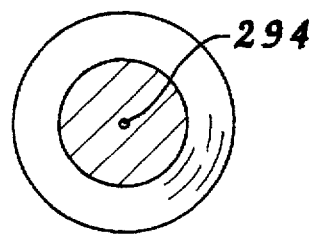
FIG. 30 is a sectional view as taken from the section line '30' shown in FIG. 28.
Figure 31:
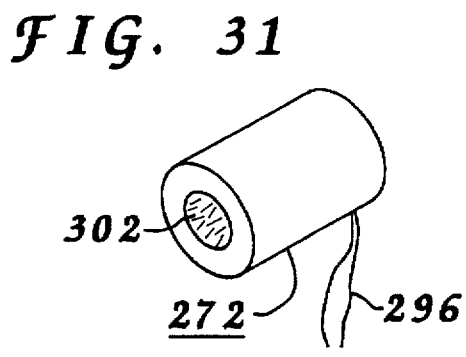
FIG. 31 is a perspective view of an autofocus assembly capable of placement within the cavity shown in FIG. 28 and FIG. 29.
Figure 32:
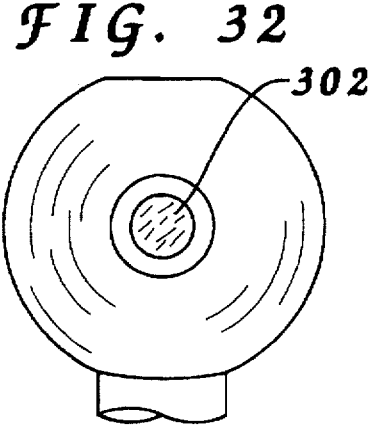
FIG. 32 is a rear plan view of the coupling ball shown in FIG. 28 following installation of the autofocus assembly shown in FIG. 31.

The use of the term vehicle is intended to encompass any motor vehicle capable of pulling a trailer. The use of the term trailer within the term stationary trailer is intended to encompass any assembly adaptable to be pulled by a vehicle. The use of the term stationary within the term stationary trailer is intended to encompass being detached and stationary in a fixed location. The use of the term backing procedure is intended to encompass the act of moving a vehicle of the above definition relative to a stationary trailer of the above definitions to permit attachment of the stationary trailer to the vehicle so that the vehicle may provide for transport of the trailer.

It is desired that any attachment placed on the stationary trailer be capable of operation without requiring a power source. Therefore, there is no need for pretesting of equipment located on the stationary trailer prior to, or during, the backing procedure.

Referring now to the drawings where like reference numerals refer to like parts throughout the various views.

Magnetically Activated Switch System

It is desired to provide an operator, not shown, of a vehicle with a confirming indication when a coupling ball member mounted to extend rearward from the vehicle during a backing procedure is positioned in a hitchable position relative to a coupling member of a stationary trailer.

Referring now to FIG. 1 through FIG. 6 wherein FIG. 1 depicts a vehicle 50 positioned relative to a stationary trailer 52 during a backing procedure. Vehicle 50 has a rear bumper 54 mounted rearward thereon. Extending rearward from vehicle 50 is a vehicle extension member 56 having mounted thereon a coupling ball member 58, as conventionally known in the art. Stationary trailer 52 has a trailer extension member 60 extending forwardly therefrom. A receiving coupling member 62, as conventionally known in the art, extends forwardly on trailer extension member 60. Prior to commencing the backing procedure, the relative height of receiving coupling member 62 is adjusted using an actuation member 64. A crank 66 rotates to cause an adjustment shaft 68, shown in FIG. 4 and FIG. 5, to raise or lower receiving coupling member 62. It is desired that the lowest extent of receiving coupling member 62 forward of adjustment shaft 68 be elevated above the highest extent of coupling ball member 58 during the backing procedure to provide adequate clearance. A height position marking band 70, shown in FIG. 4 and FIG. 5, may be prepositioned upon adjustment shaft 68 to provide the operator with guidance to obtain a proper elevational adjustment during subsequent backing procedures. It is also possible to provide the respective guidance systems with an ability to determine vertical angular orientation and inform the operator of the relative clearance distance during the backing procedure.

FIG. 2 depicts the relative position of vehicle 50 and stationary trailer 52 in a hitchable position 72 following the satisfactory completion of the backing procedure. FIG. 5 and FIG. 6 depict the relative position of coupling ball member 58 and receiving coupling member 62 following the satisfactory completion of the backing procedure.

A magnetically activated switch assembly 74 has a base 76 which attaches to vehicle extension member 56, shown clearly in FIG. 5 and FIG. 6, between coupling ball member 58 and vehicle 50 by any of the methods conventionally known in the art. Deployment of magnetically activated switch assembly 74 may be permanent on vehicle 50 although preferably, such deployment is temporary for usage during the backing procedure. A magnetically activated switch 78, shown in FIG. 7a and FIG. 7b, forms an upper extent 80 of magnetically activated switch assembly 74. Following deployment of magnetically activated switch assembly 74, magnetically activated switch 78 is elevated above vehicle extension member 56 with upper extent 80 of magnetically activated switch 78 in close elevational orientation to an upper extent 82 of coupling ball member 58. A wire 84 provides electronic transfer of a signal from magnetically activated switch 78 for subsequent informing of an operator of vehicle 50 of arrival at hitchable position 72, shown in FIG. 2.

A magnetic member 86 attaches to receiving coupling member 62 of stationary trailer 52 by any of the methods conventionally known in the art. Following deployment of magnetic member 86, a lower extent 88 of magnetic member 86 is in close elevational orientation to a lower extent 90 of receiving coupling member 62.

As clearly shown in FIG. 5 and FIG. 6, when in hitchable position 72, upper extent 80 of magnetically activated switch 78 and lower extent 88 of magnetic member 86 are vertically aligned one to the other. When vehicle 50 is maneuvered during the backing procedure the relative elevational orientation of upper extent 80 of magnetically activated switch 78 remains relatively consistent to the ground, not shown. Thus, when upper extent 80 of magnetically activated switch 78 and lower extent 88 of magnetic member 86 are at their closest possible relational positioning they are vertically oriented one to the other.

When deployed, positioning of magnetic member 86 on stationary trailer 52 and magnetically activated switch 78 on vehicle 50 are such that when vertical alignment of upper extent 80 and lower extent 88 occurs, connection of stationary trailer 52 to vehicle 50 may occur as conventionally known in the art.

As shown in FIG. 7a and FIG. 7b, magnetically activated switch 78 has a housing 92 which includes upper extent 80. Contained within housing 92 is a first connection 94 and a second connection 96 spaced one from the other. A first wire 98 connects to first connection 94 while a second wire 100 connects to second connection 96. A magnetically influenced contact 102 extends from first connection 94 and extends outward in close proximity to second connection 96. In the absence of a magnetic attraction, magnetically influenced contact 102 does not contact second connection 96, as shown in FIG. 7a. In the presence of a magnetic attraction, as exists when magnetic member 86 is in close proximity as shown in FIG. 5 and FIG. 6, magnetically influenced contact 102 does contact second connection 96, as shown in FIG. 7b. When such contact occurs, an electrical signal may pass between first wire 98 and second wire 100 to complete a circuit.

An alternative method of deploying a magnetically activated switch is to deploy it within a cavity 104 of a coupling ball member 106 mounted on vehicle extension member 56, as depicted in FIG. 8. Cavity 104 has an opening 108 to provide for installation of the magnetically activated switch, not shown in this view, and to provide for exposure of the upper extent. A connection channel 110 extends through coupling ball member 106 from cavity 104 to a lower extent 112 for passage of wiring. In this embodiment the magnetically activated switch preferably remain permanently installed on vehicle 50.

When the magnetically activated switch is installed within coupling ball member 106 a magnetic member 114 may be deployed as shown in FIG. 9a and FIG. 9b. A placement plate 116 receives a magnet 118 while an elastic strap 120 is utilized to retain magnetic member 114 on receiving coupling member 62. This arrangement provides for placement of magnet 118 relative to receiving coupling member 62 such that when hitchable position 72 is arrived at the magnetically activated switch and magnet 118 are at their closest possible approach during the backing procedure.

When a permanent installation is desired, or when installation within the coupling ball member is not feasible, a displacable magnetic switch assembly 122 may be used, as shown in FIG. 10a and FIG. 10b. Magnetically activated switch 78, as disclosed above, is incorporated into displacable magnetic switch assembly 122. Displacable magnetic switch assembly 122 may be mounted to vehicle extension member 56 using any of the methods conventionally known in the art. A mounting bracket 124 permits attachment of displacable magnetic switch assembly 122 to vehicle extension member 56 using bolts 126. A pivotal connection 128 provides for transfer of displacable magnetic switch assembly 122 between a stored position 130, shown in FIG. 10a, and an active position 132, shown in FIG. 10b. While in stored position 130 displacable magnetic switch assembly 122 will not interfere with an attached receiving coupling member, not shown. A wire 134 provides for transfer of an electronic signal indicative of a change in status of magnetically activated switch 78.

Autofocus

It is desired to provide an operator of a vehicle with feedback indicative of measurements of relative distances and relative angular orientation between the vehicle and a stationary trailer during a backing procedure. An autofocus assembly, as conventionally known in the art, provides for an accurate measurement of both the distance measurement as well as the measurement of an angular orientation between the vehicle and the stationary trailer during the backing procedure.

FIG. 11a through FIG. 13b depict three positions of vehicle 50 relative to stationary trailer 52. Stationary trailer 52, in this embodiment of the invention, does not have any special device attached thereto. An autofocus assembly 136 is mounted rearward on vehicle 50. Autofocus assembly 136 has a sight zone 138, as more clearly shown in FIG. 14a and FIG. 14b, which extends rearward from rear bumper 54 of vehicle 50. Sight zone 138 has an imaginary center projection line 140 which divides sight zone 138 into a first side zone 142 and a second side zone 144. Imaginary center projection line 140 extends aligned with coupling ball member 58 and parallel to an imaginary center line 146 of vehicle 50, shown in FIG. 11a and FIG. 14a. When vehicle 50 and stationary trailer 52 are in hitchable position 72, shown in FIG. 13a and FIG. 13b, imaginary center projection line 140, not shown in FIG. 13a, will vertically intersect receiving coupling member 62. Autofocus assembly 136 is capable of identifying a nearest district object within sight zone 138. This identification is capable of being limited to elements having a predetermined elevational measurement from ground level, as conventionally known in the art. Following such identification of the nearest object a calculation of a measurement of distance between autofocus assembly 136 and the object and a calculation of an angular orientation between imaginary center projection line 140 and the object occurs. During the backing procedure the nearest point on stationary trailer 52 becomes the nearest object. These calculations are then transferred to the operator of vehicle 50, as more fully disclosed below, to indicate relative positioning of vehicle 50 and stationary trailer 52 during the backing procedure.

FIG. 11a and FIG. 11b depict vehicle 50 at a significant spacing from stationary trailer 52 as may occur at the beginning of the backing procedure. FIG. 12a and FIG. 12b depict vehicle 50 during movement toward stationary trailer 52 as may occur during the backing procedure. FIG. 13a and FIG. 13b depict vehicle 50 following arrive at hitchable position 72 relative to stationary trailer 52 as may occur at the end of the backing procedure.

Numerous autofocus assemblies are known in the art, and may be employed with the instant invention. The following two examples are only used to illustrate the principles of the invention.

A dual image autofocus assembly 148, as conventionally known in the art, is depicted in FIG. 15a and FIG. 15b. Dual image autofocus assembly has a housing 150 having exposed thereon a first sight port 152 and a second sight port 154. First sight port 152 has a first sight zone 156 while second sight port 154 has a second sight zone 158. First sight zone 156 and second sight zone 158 overlap yet yield slightly different images of objects located closer than infinity. Dual image autofocus assembly 148 is capable of determining a distance measurement and an angular orientation measurement of an object 160 located within first sight zone 156 and within second sight zone 158.

A diffusion autofocus assembly 162, as conventionally known in the art, is depicted in FIG. 16. Diffusion autofocus assembly 162 has a housing 164 having exposed thereon a sight port 166. Sight port 166 has a sight zone 168. A first object 170, a second object 172 and a third object 174 are depicted distributed outward from diffusion autofocus assembly 162 respectively. Diffusion autofocus assembly 162 is capable of identifying the closest object 170, 172 or 174 and capable of determining a distance measurement and an angular orientation measurement from diffusion autofocus assembly 162 to that closest object, being first object 170 in this case.

Light Reflective

It is desired to provide an operator of a vehicle with feedback indicative of measurements of relative distances and relative angular orientation between the vehicle and a stationary trailer during a backing procedure. A light reflective assembly, as conventionally known in the art, provides for an accurate measurement of both the distance measurement as well as the measurement of an angular orientation between the vehicle and the stationary trailer during the backing procedure. A sending unit is capable of producing light having uniquely identifiable characteristics. A reflector is capable of reflecting the produced light. A receiving unit is capable of identifying light having the uniquely identifiable characteristics. Each of these three, (3), components are conventionally known in the art for measuring distance and/or angle orientation. A combination of one, (1), reflector and one, (1), sending or receiving unit and two, (2), of the remaining unit, either sending or receiving, cooperate to form the light reflective assembly.

FIG. 17a through FIG. 20b depict a light reflective assembly 176 comprising a light generating unit 178, a reflector 180, a first receiving unit 182 and a second receiving unit 184. Light generating unit 178 is capable of producing a light transmission having uniquely identifiable characteristics. Concurrent with the production of the light transmission, light generating unit 178 produces an electronic signal indicative of the uniquely identifiable characteristics of the produced light transmission. The light transmission is generated to extend throughout a broadcast zone 186 which extends rearward from vehicle 50. When stationary trailer 52 is within broadcast zone 186, as would be the case during the backing procedure, the light transmission passes over stationary trailer 52. Reflector 180 has a reflective surface, not shown, so shaped as to reflect received light in a widely dispersed manner. This is accomplished by having the reflective surface either concave shaped, as depicted, convex shaped or formed of a plurality of planar segments. Reflector 180 is attached to stationary trailer 52 using any method conventionally known in the art in close proximity to receiving coupling member 62. Such attachment provides for a reflection of any light generated from a location generally in front of stationary trailer 52. An attachment strap 188, as shown in FIG. 20a and FIG. 20b, provides for attachment to receiving coupling member 62.

Following reflection from reflector 180 the light transmission is received by first receiving unit 182 and second receiving unit 184 mounted on vehicle 50 on opposing lateral sides of light generating unit 178. First receiving unit 182 receives reflected light which travels along a first reflected path 190 while second receiving unit 184 receives reflected light which travels along a second reflected path 192. Receiving units 182 and 184 produce an electronic signal indicative of the uniquely identifiable characteristics of the received light. A central processing unit 194, as conventionally known in the art, receives the electronic signals from light generating unit 178 indicative of characteristics of the transmitted light including the uniquely identifiable characteristics and broadcast moment. Central processing unit 194 also receives the electronic signals from first receiving unit 182 and second receiving unit 184 indicative of characteristics of the respective received reflected light. Central processing unit 194 then makes comparisons and computations based upon the input and calculates the relative position of reflector 180. This calculation of relative position includes a measurement of distance as well as a measurement of angular orientation. The relative position of reflector 180, due to close proximity to receiving coupling member 62, is indicative of relative positioning of receiving coupling member 62.

FIG. 21 depicts a light reflective assembly 198 comprising a first light generating unit 199, a second light generating unit 200, a light receiving unit 201 and reflector 180. In this embodiment two, (2), units generate light while a single unit receives the reflected light. Central processing unit 194 receives input from first light generating unit 199, second light generating unit 200 and light receiving unit 201 and makes comparisons and computations based upon the input and calculates the relative position of reflector 180.

As depicted in FIG. 22 it is possible to increase either the number of light generating units, receiving units or both. Each light generating unit would generate a light transmission uniquely identifiable at any given moment in time from any other light generating units. Similarly, it is possible to limit each respective receiving unit to determine presence of a specifically identifiable characteristic of received light. As one example, conventionally known in the art, each receiving unit may be capable of identifying a particular light source and calculate a relative angle of origin 196, as shown in FIG. 22.

FIG. 22 depicts a light reflective assembly 202 comprising a first light generating unit 203, a second light generating unit 204, reflector 180, a first receiving unit 205, a second receiving unit 206, a third receiving unit 208 and a fourth receiving unit 210. First light generating unit 203 and second light generating unit 204 are each capable of producing a light transmission having uniquely identifiable characteristics to extend rearward from vehicle 50 throughout a broadcast zone 212 and a broadcast zone 214 respectively. When stationary trailer 52 is within broadcast zones 212 and 214, as would be the case during the backing procedure, the light transmission passes over stationary trailer 52. Reflector 180 has a reflective surface as previously disclosed so as to reflect any received lights in a widely dispersed manner. As disclosed above, reflector 180 is attached in close proximity to receiving coupling member 62. Each respective receiving unit 205 206, 208 and 210 may be so configured to receive and measure all transmitted light generated by light generating units 203 and 204 or they may be configured to receive and measure transmitted light generated by select light generating units 203 or 204. The example depicted has first receiving unit 205 and third receiving unit 208 identifying the reflected light produced by first light generating unit 203 and traveling along a first reflected path 216 and a third reflected path 218 respectively while second receiving unit 206 and fourth receiving unit 210 identify the reflected light produced by second light generating unit 204 and traveling along a second reflected path 220 and a fourth reflected path 222.

Numerous methods exist, as conventionally known in the art, to produce light having uniquely identifiable characteristics. Similarly, numerous uniquely identifiable characteristics of light exist which may be produced. The following examples illustrate several of the many possible characteristics which may be incorporated into the instant invention.

FIG. 23 depicts a series of light emissions 224 wherein six, (6), distinct light emissions are produced. A first burst duration 226, a second burst duration 228, a third burst duration 230, a fourth burst duration 232, a fifth burst duration 234 and a sixth burst duration 236 comprise the light emissions depicted. Each respective sequential burst duration from first burst duration 226 to sixth burst duration 236 has a slightly different duration of time of the respective light emission. Therefore, each burst duration 226, 228, 230, 232, 234 and 236 represents a uniquely identifiable duration of time of the respective burst of light. In this example a duration of pause 238 separates each adjacent burst duration 226, 228, 230, 232, 234 and 236 respectively. With each adjacent burst duration 226, 228, 230, 232, 234 and 236 being uniquely identifiable, each duration of pause 238 is identical.

FIG. 24 depicts a series of light emissions 240 wherein six, (6), identical light emissions are produced. Each light emission has a duration of burst 242. Each adjacent duration of burst 242 is separated by a distinct pause duration. A first pause duration 244, a second pause duration 246, a third pause duration 250, a fourth pause duration 252 and a fifth pause duration 254 comprise the pauses between adjacent light emissions depicted. Each respective sequential pause duration from first pause duration 244 to fifth pause duration 254 has a slightly different duration of time of the respective pause. Therefore, each pause duration 244, 246, 250, 252 and 254 represents a uniquely identifiable duration of time of the respective pause. With each adjacent pause duration 244, 246, 250, 252 and 254 being uniquely identifiable, each duration of burst 242 is identical.

FIG. 25 depicts a spectrum of light 256 as conventionally known in the art. Spectrum of light 256 has an infinite number of select parts depending only upon the accuracy of the equipment measuring the respective select parts. A first select part 258 is selected from spectrum of light 256. A second select pad 260 is selected from spectrum of light 256. An infinite number of other such selections may be made. Referring now also to FIG. 20a it is possible to configure light generating unit 178 to produce light within the select bandwidth represented by first select pad 258. Similarly it is possible to configure first receiving unit 182 and second receiving unit 184 to measure reflected light within the select bandwidth represented by first select pad 258. It is also possible to alternate between production of light within a first range, as exampled by first select pad 258, and a second range, as exampled by second select pad 260.

Numerous other variations exist to produce and/or detect light having uniquely identifiable characteristics.

Combination Systems

It may be desired to provide the operator of the vehicle with both guidance during the backing procedure as well as confirmation of arrive at the hitchable position. FIG. 26 depicts a guidance system combination 262 having an autofocus system 264, fully disclosed above, and a magnetic switch system 266, also fully disclosed above. Autofocus system 264 provides electronic transfer of data indicative of relational positioning of coupling ball member 58 relative to receiving coupling member 62 during the backing procedure. This electronic transfer is then converted, more fully disclosed below, to inform the operator of the progress of the backing procedure. Magnetic switch system 266 provides electronic transfer of a signal indicative of arrive of coupling ball member 58 relative to receiving coupling member 62 at the hitchable position, not shown in FIG. 26. This electronic transfer is then converted, more fully disclosed below, to inform the operator of a satisfactory conclusion of the backing procedure.

Similarly, it is possible to provide for a guidance system combination 268, as depicted in FIG. 27, having a light reflective system 270, fully disclosed above, and magnetic switch system 266. Light reflective system 270 provides electronic transfer of data indicative of relational positioning of coupling ball member 58 relative to receiving coupling member 62 during the backing procedure. This electronic transfer is then converted, more fully disclosed below, to inform the operator of the progress of the backing procedure. Magnetic switch system 266 provides electronic transfer of a signal indicative of arrive of coupling ball member 58 relative to receiving coupling member 62 at the hitchable position, not shown in FIG. 27. This electronic transfer is then converted to inform the operator of a satisfactory conclusion of the backing procedure.

Coupling Ball Mounting

As disclosed above magnetically activated switch 76 may be mounted within coupling ball member 106 having cavity 104, see FIG. 7a and FIG. 8. Referring now to FIG. 28 through FIG. 32, it is similarly possible to mount either an autofocus assembly 272 or a light generating unit, not shown, within a cavity 274 of a coupling ball member 276. Coupling ball member 276 comprises a coupling ball 278, an extension base 280, a mounting base 282 and an extension shaft 284 having threads 286. Cavity 274 has an opening 288 which extends inward on coupling ball 278 relatively horizontally. An anchoring channel 290 extends vertically to permit insertion of an anchor screw 292. A connection channel 294 extends downward from cavity 274 through coupling ball member 276 to provide for convenient wiring connection of autofocus assembly 272.

Autofocus assembly 272 is mounted within cavity 274. A wire 296 extends downward through connection channel 294. Anchor screw 292 is inserted within anchoring channel 290 and into an anchor aperture 298 of autofocus assembly 272. Anchor screw 292 seats within an anchoring channel screw seat 300 to provide for a flush mount. Autofocus assembly 272 is then secured within coupling ball member 276. When properly mounted on a vehicle, not shown in these views, autofocus assembly 272 has a sight port 302 which is aligned rearwardly with the longitudinal axis of the vehicle.

Operator Informing

Figure 33:
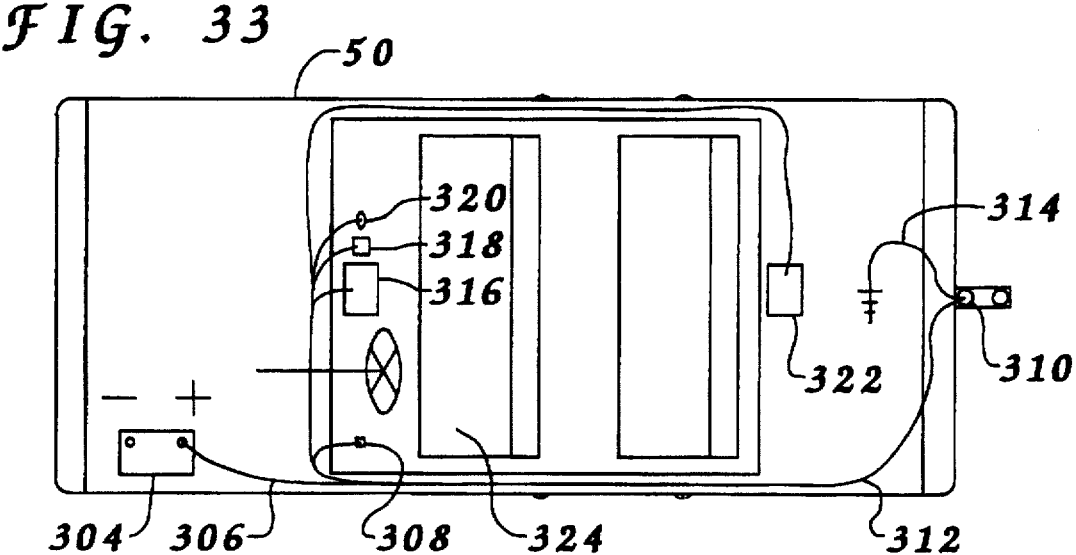
FIG. 33 is a sectional view as taken from the section line '33' shown in FIG. 12b.

Referring now to FIG. 33, vehicle 50 is depicted along with various examples of modes of informing the operator, not shown, of the progress and/or completion of the backing procedure. It is noted that this informing of the operator is applicable to any embodiments of the instant invention.

Vehicle 50 has a power supply in the form of a battery 304 which is connected to the system by a power supply wire 306. It is desirable to provide an activation switch 308 which permits the operator to activate and deactivate the deployed system at will.

A guidance device 310 is representative of any of the systems previously disclosed, including those comprising a combination of two systems. A connection wire 312 connects guidance device 310 to the system while a ground wire 314 completes the circuit.

A display panel 316 displays the relative position of vehicle 50 and stationary trailer, not shown here, during the backing procedure. A light panel 318 acts to display the relative position of vehicle 50 and the stationary trailer during the backing procedure. A speaker 320 acts to audibly inform the operator of the relative position of vehicle 50 and the stationary trailer during the backing procedure. A rear display panel 322 may be mounted rearward of an operator compartment 324 to display the relative position of vehicle 50 and stationary trailer during the backing procedure while permitting the operator to visually observe the stationary trailer during the backing procedure. The before mentioned feedback informing devices may be deployed singularly or in any combination.

Figure 34:
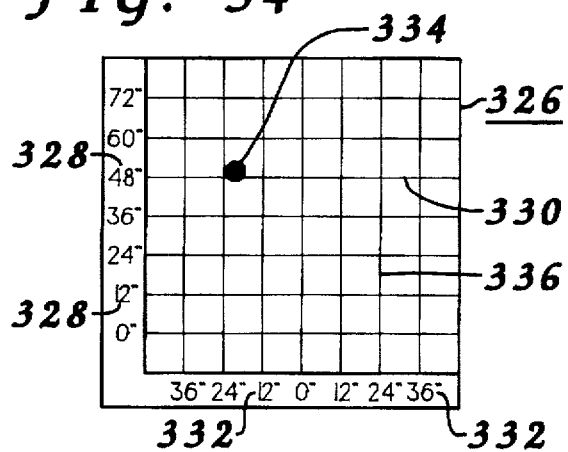
FIG. 34 is a front plan view of a positional display panel.
Figure 35:
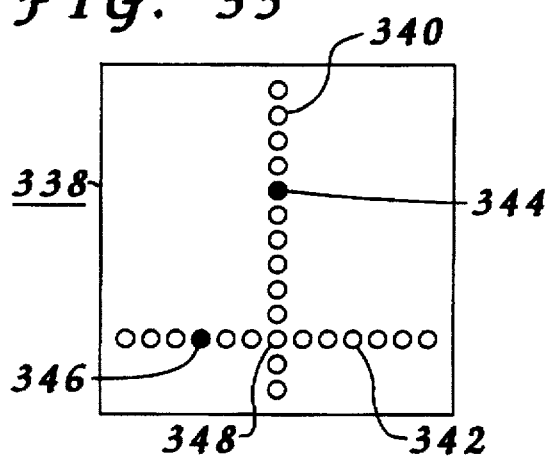
FIG. 35 is a front plan view of a second embodiment of a positional display panel.
Figure 36:
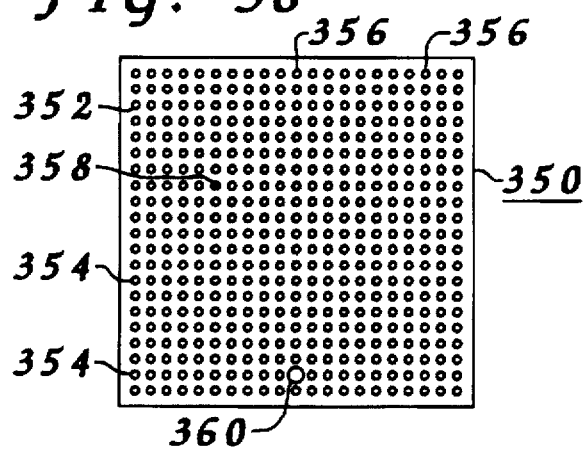
FIG. 36 is a front plan view of a third embodiment of a positional display panel.

FIG. 34, FIG. 35 and FIG. 36 depict three, (3), possible configurations of positional display panels. It is realized that many such configurations exist. FIG. 34 depicts a positional display panel 326 as possible using an liquid crystal display as conventionally known in the art. A series of longitudinal distance identifying markings 328 extend upward along the left side of positional display panel 326. Extending outward from each is a grid line 330 which traverses the remainder of positional display panel 326. A series of lateral distance identifying markings 332 extend across the bottom of positional display panel 326. Extending upward from each is a grid line 336 which crosses the remainder of positional display panel 326. Lateral distance identifying markings 332 indicate a distance to one side or the other from the central axis of the vehicle, not shown. A positional placement display mark 334 is displayed on positional display panel 326 within the range of grid lines 330 and grid lines 336 indicative of the relative positioning of the coupling ball member, not shown, and the receiving coupling member, not shown to inform the operator of spacial orientation during the backing procedure.

FIG. 35 depicts a positional display panel 338 as possible using a row of longitudinal distance identifying lights 340 and an intersecting row of lateral distance identifying lights 342. Within the row of longitudinal distance identifying lights 340 a select light will be an active longitudinal light 344 which will be indicative of a distance measurement from the coupling ball member, not shown, to the receiving coupling member, not shown. Within the row of lateral distance identifying lights 342 a select light will be an active lateral light 346 which will be indicative of a distance measurement from the longitudinal axis of the vehicle, not shown, to the receiving coupling member. An intersection light 348 will be the common light, and the point of intersection, of the row of longitudinal distance identifying lights 340 and the row of lateral distance identifying lights 342. When intersection light 348 is the only active light, the coupling ball member and the receiving coupling member will be in the hitchable position.

FIG. 36 depicts a positional display panel 350 as possible using a positional identifying light array 352 having a series of rows 354 and a series of columns 356. One, (1), light within positional identifying light array 352 will be an active light 358 and the only light illuminated. A coupling position indicating light 360 will have a uniquely identifiable feature as exampled by being larger than the size of the remaining lights or being a different color that the color of the remaining lights. The relative position of active light 358 from coupling position indicating light 360 will act to inform the operator of the relative position of the vehicle to the receiving coupling member. When coupling position indicating light 360 is active the hitchable position has been obtained.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle backup guidance system to provide for an operator of a vehicle to be informed of a distance measurement and an angular orientation measurement, both measurements indicative of a relative position of a coupling ball member and a coupling member during a backing procedure, the coupling ball member mounted on a rearward end of the vehicle, the coupling member mounted on a forward end of a stationary trailer, the backing procedure to position the vehicle relative to the stationary trailer in a hitchable position to allow the connection of the coupling member to the coupling ball member, the coupling member of the stationary trailer being a closest object of the stationary trailer to the vehicle during the backing procedure, the vehicle backup guidance system comprising:

a) an autofocus assembly to provide for identifying a closest object within a predetermined sight zone, the sight zone having a center projection line, a maximum angular vertical limit upward from the center projection line, a maximum angular vertical limit downward from the center projection line, a maximum angular horizontal limit right of the center projection line and a maximum angular horizontal limit left of the center projection line, the autofocus assembly mounted on the rearward end of the vehicle in close proximity to the coupling ball member, the sight zone extending rearward from the vehicle with the center projection line horizontally aligned with a center longitudinal axis of the vehicle, the autofocus assembly comprising:

1) distance measurement means to provide for a calculation of a distance measurement from the autofocus assembly to the closest object within the predetermined sight zone during the backing procedure, the calculation returning a distance measurement;

2) angular orientation measurement means to provide for a calculation of an angular offset measurement from the center projection line of the sight zone to the closest object within the predetermined sight zone during the backing procedure, the calculation returning an angular orientation measurement;

b) transfer means to provide for electronically transferring the distance measurement and for electronically transferring the angular orientation measurement;

c) receiving means to provide for receiving the electronically transferred distance measurement and the electronically transferred angular orientation measurement;

d) indication means to provide for informing the operator of the positional placement of the autofocus assembly relative to the closest object within the sight zone during the backing procedure, the indication means receiving the electronically transferred distance measurement and the electronically transferred angular orientation measurement from the receiving means;

whereby the operator is informed of the positional placement of the autofocus assembly, and therefore of the vehicle upon which the autofocus assembly is mounted, and the closest object within the sight zone, and therefore of the coupling member of the stationary trailer, during the backing procedure.

2. The vehicle backup guidance system defined in claim 1 wherein the angular offset measurement is limited to an angular offset and a directional indication, the angular offset a measurement from of the center projection line measured horizontal to an intersection with a vertical projection plane having the closest object within the sight zone and the autofocus assembly, the directional indication an indication of right or left of the center projection line to the intersection.

3. The vehicle backup guidance system defined in claim 1 wherein the autofocus assembly further comprises identification of the closest object by employing a clarity of diffusion of image assembly, the clarity of diffusion of image assembly continually focusing to identify by diffusion of image a nearest object within the zone of sight.

4. The vehicle backup guidance system defined in claim 1 wherein the autofocus assembly further comprises identification of the closest object by employing at least two sight ports and a comparison assembly to identify the nearest object within the zone of sight.

5. The vehicle backup guidance system defined in claim 1 further comprising:

a) a magnetic member to provide for producing a magnetic field, the magnetic member positionable upon the stationary trailer in close proximity to the coupling member during the backing procedure;

b) a switch having an open position and a closed position, the switch biased to remain in the open position, the switch mounted upon the vehicle in close proximity to the coupling ball member of the vehicle, the switch transferred from the open position to the closed position when the switch moves into close proximity to the magnetic member;

c) transfer means to provide for a transfer of an electronic signal when the switch is transferred between the open position and the closed position;

d) operator confirmation means to provide for an informing of the operator of the vehicle when the vehicle arrives at the hitchable position relative to the stationary trailer, the informing precipitated by the electronic signal transferred by the transfer means;

whereby, in addition to providing the operator of the vehicle with distance measurement and angular orientation information during the backing procedure, the operator is informed by the operator confirmation means of arrive at the hitchable position of the vehicle relative to the stationary trailer.

6. A vehicle backup guidance system to provide for an operator of a vehicle to be informed of an alignment orientation indication and a distance measurement indication, both indications of a relative position of a coupling ball member and a coupling member during a backing procedure, the coupling ball member mounted on a rearward end of the vehicle, the coupling member mounted on a forward end of a stationary trailer, the backing procedure to position the vehicle relative to the stationary trailer to allow the connection of the coupling member to the coupling ball member, the vehicle backup guidance system comprising:

a) a sending unit mounted on the vehicle in close proximity to the coupling ball member, the sending unit to provide for:

1) production of a transmitted light having unique characteristics and generated to extend rearward from the rearward end of the vehicle, and;

2) production of an electronic sending signal indicative of the unique characteristics of the transmitted light;

b) at least one reflector mounted on the stationary trailer in close proximity to the coupling member, the reflector to provide for a reflection of the transmitted light from the sending unit;

c) a first receiving unit and a second receiving unit, the first receiving unit mounted on the vehicle on a first lateral side of the coupling ball member, the second receiving unit mounted on the vehicle on a second lateral side of the coupling ball member, the first lateral side of the coupling ball member and the second lateral side of the coupling ball member located on opposing sides of the coupling ball member, the first and the second receiving units to provide for receiving light, the light received reflected from the reflector mounted on the stationary trailer, the first receiving unit and the second receiving unit each producing an electronic receiving signal indicative of unique characteristics of the received light;

d) transfer receiving means to provide for receiving:
  1) the electronic sending signal produced by the sending unit;
  2) the electronic receiving signals produced by the first receiving unit and the second receiving unit;

e) measuring means to provide for a measurement of a distance and a measurement of an alignment of a relative placement of the sending unit, the reflector and the receiving units based upon a comparison of the electronic signals received by the transfer receiving means;

f) orientation transfer means to provide for electronically transferring an electronic signal of the measurement of the distance and for electronically transferring an electronic signal of the measurement of the alignment;

g) indication means to provide for informing the operator based upon the measuring means of the alignment orientation indication of the positional placement of the vehicle relative to the stationary trailer and the distance measurement indication of the positional placement of the vehicle relative to the stationary trailer, the indication means receiving the electronic signal transferred by the orientation transfer means;

whereby the sending unit produces the transmitted light having unique characteristics which is generated to extend rearward from the rearward end of the vehicle to be reflected by the reflector mounted on the trailer to be received by the receiving units mounted on the vehicle on opposing lateral sides of the coupling ball member wherein the measuring means determines the measurement of the distance and the alignment of the relative placement of the sending unit, the reflector and the receiving units and these measurements are indicated by the indication means to the operator of the vehicle.

7. The vehicle backup guidance system defined in claim 6 wherein the unique characteristics of the transmitted light generated by the sending unit comprises bursts of predetermined durations of time and having a predetermined duration of time between each sequential burst.

8. The vehicle backup guidance system defined in claim 6 wherein the unique characteristics of the transmitted light generated by the sending unit comprises being limited to a uniquely identifiable part of a spectrum of light.

9. The vehicle backup guidance system defined in claim 6 wherein the sending unit is mounted on a first lateral side of the coupling ball member and wherein the vehicle backup guidance system further comprises a second sending unit mounted on a second lateral side of the coupling ball member, the first lateral side of the coupling ball member and the second lateral side of the coupling ball member located on opposing sides of the coupling ball member, the second sending unit to provide for:

a) production of a transmitted light having unique characteristics and generated to extend rearward from the rearward end of the vehicle;

b) production of an electronic sending signal indicative of the unique characteristics of the transmitted light, and; wherein the reflector further provides for reflection of the transmitted light from the second sending unit and wherein the transfer receiving means further provides for receiving the electronic sending signal produced by the second sending unit and wherein the measuring means further provides for the measurement of the distance and the measurement of the alignment of the relative placement of the sending unit, the reflector, and the receiving units based upon an inclusion of the electronic sending signal of the second sending unit based upon the electronic signals received by the transfer receiving means;

whereby the orientation transfer means which provides for electronically transferring the electronic signal of the measurement of the distance and for electronically transferring the electronic signal of the measurement of the alignment to the indication means includes the comparison of the electronic signal sent by the second sending unit and any associative electronic signals sent by the first receiving unit and the second receiving unit.

10. The vehicle backup guidance system defined in claim 6 further comprising a third receiving unit and a fourth receiving unit, the third receiving unit mounted on the first lateral side of the coupling ball member adjacent the first receiving unit, the fourth receiving unit mounted on the second lateral side of the coupling ball member adjacent the second receiving unit, the third receiving unit and the fourth receiving unit each to provide for receiving light, the light received reflected from the reflector mounted on the stationary trailer, the third receiving unit and the fourth receiving unit each producing an electronic receiving signal indicative of unique characteristics of the received light;

and wherein the transfer receiving means further provides for receiving the electronic receiving signals produced by the third receiving unit and the electronic receiving signals produced by the fourth receiving unit and wherein the measuring means further provides for the measurement of the distance and the measurement of the alignment of the relative placement of the sending unit, the reflector, and the receiving units based upon the inclusion of the electronic receiving signal of the third receiving unit and the electronic receiving signal of the fourth receiving unit based upon the electronic signals received by the transfer receiving means;

whereby the orientation transfer means which provides for electronically transferring the electronic signal of the measurement of the distance and for electronically transferring the electronic signal of the measurement of the alignment to the indication means includes the comparison of the electronic signal produced by the third receiving unit and the electronic signal produced by the fourth receiving unit.

11. A vehicle backup guidance system to provide for an operator of a vehicle to be informed of an alignment orientation indication and a distance measurement indication, both indications of a relative position of a coupling ball member and a coupling member during a backing procedure, the coupling ball member mounted on a rearward end of the vehicle, the coupling member mounted on a forward end of a stationary trailer, the backing procedure to position the vehicle relative to the stationary trailer to allow the connection of the coupling member to the coupling ball member, the vehicle backup guidance system comprising:

a) a first sending unit mounted on the vehicle in close proximity to the coupling ball member, the first sending unit to provide for:
   1) production of a transmitted light having unique characteristics and generated to extend rearward from the rearward end of the vehicle, and;
   2) production of an electronic sending signal indicative of the unique characteristics of the transmitted light;

b) a second sending unit mounted on the vehicle in close proximity to the coupling ball member, the second sending unit to provide for:
   1) production of a transmitted light having unique characteristics and generated to extend rearward from the rearward end of the vehicle, and;
   2) production of an electronic sending signal indicative of the unique characteristics of the transmitted light;

c) a reflector mounted on the stationary trailer in close proximity to the coupling member, the reflector to provide for a reflection of the transmitted light from the first sending unit and the second sending unit;

d) a receiving unit mounted on the vehicle in close proximity to the coupling ball member, the receiving unit to provide for receiving light, the light received reflected from the reflector mounted on the stationary trailer, the receiving unit producing an electronic receiving signal indicative of unique characteristics of the received light;

e) transfer receiving means to provide for receiving:
   1) the electronic sending signal produced by the first sending unit;
   2) the electronic sending signal produced by the second sending unit;
   3) the electronic receiving signals produced by the receiving unit;

f) measuring means to provide for a measurement of a distance and a measurement of an alignment of a relative placement of the first sending unit, the second sending unit, the reflector and the receiving unit based upon a comparison of the electronic signals received by the transfer receiving means;

g) orientation transfer means to provide for electronically transferring an electronic signal of the measurement of the distance and for electronically transferring an electronic signal of the measurement of the alignment;

h) indication means to provide for informing the operator based upon the measuring means of the alignment orientation indication of the positional placement of the vehicle relative to the stationary trailer and the distance measurement indication of the positional placement of the vehicle relative to the stationary trailer, the indication means receiving the electronic signal transferred by the orientation transfer means;

whereby the sending units each produce transmitted light having unique characteristics which is generated to extend rearward from the rearward end of the vehicle to be reflected by the reflector mounted on the trailer to be received by the receiving unit mounted on the vehicle wherein the measuring means determines the measurement of the distance and the alignment of the relative placement of the sending units, the reflector and the receiving unit and these measurements are indicated by the indication means to the operator of the vehicle.

12. The vehicle backup guidance system defined in claim 11 wherein the receiving unit is mounted on a first lateral side of the coupling ball member and wherein the vehicle backup guidance system further comprises a second receiving unit mounted on a second lateral side of the coupling ball member, the first lateral side of the coupling ball member and the second lateral side Of the coupling ball member located on opposing sides of the coupling ball member, the second receiving unit to provide for receiving light, the light received reflected from the reflector mounted on the stationary trailer, the second receiving unit producing an electronic receiving signal indicative of unique characteristics of the received light, wherein the transfer receiving means further provides for receiving the electronic sending signal produced by the second receiving unit and wherein the measuring means further provides for the measurement of the distance and the measurement of the alignment of the relative placement of the first sending unit, the second sending unit, the reflector, the receiving unit and the second receiving unit based upon an inclusion of the electronic sending signal of the second receiving unit based upon the electronic signals received by the transfer receiving means;

whereby the orientation transfer means which provides for electronically transferring the electronic signal of the measurement of the distance and for electronically transferring the electronic signal of the measurement of the alignment to the indication means includes the comparison of the electronic signal received by the second receiving unit.

* * * * *